United States Patent [19]

Jaeger et al.

[11] Patent Number: 4,931,028
[45] Date of Patent: Jun. 5, 1990

[54] TOY BLIMP

[76] Inventors: Hugh D. Jaeger, 3209 W. 76th St., #207, Minneapolis, Minn. 55435; James M. Hawley, 4272 Queen Ave. S., Minneapolis, Minn. 55410

[21] Appl. No.: 232,229

[22] Filed: Aug. 15, 1988

[51] Int. Cl.⁵ .................. A63H 27/10; B64B 1/02
[52] U.S. Cl. .................. 446/225; 244/30; 446/68
[58] Field of Search ............ 446/225, 220, 68; 244/30, 31

[56] References Cited

U.S. PATENT DOCUMENTS

| | | | |
|---|---|---|---|
| 1,561,721 | 11/1925 | Humphrey | 446/225 X |
| 2,763,958 | 9/1956 | Lemelson | 446/225 |
| 2,858,386 | 10/1958 | Bonner | 244/190 X |
| 3,153,878 | 10/1964 | Smith, Jr. | 446/225 |
| 3,260,017 | 7/1966 | Wolfe | 446/225 |
| 3,292,304 | 12/1966 | Wolfe | 446/225 |
| 3,957,230 | 5/1976 | Boucher et al. | 244/53 |
| 3,971,533 | 7/1976 | Slater | 244/30 |
| 4,038,777 | 8/1977 | Schwartz | 244/30 X |
| 4,085,912 | 4/1978 | Slater | 244/30 X |
| 4,204,656 | 5/1980 | Seward, III | 244/30 |
| 4,408,412 | 10/1983 | Forker | 446/225 |
| 4,729,750 | 3/1988 | Prusman | 446/225 |
| 4,799,914 | 1/1989 | Hutchinson | 446/225 |

OTHER PUBLICATIONS

Fantastic Flying Funship Pilot's Handbook, Pioneer Balloon Company, Wichita, Kansas 67208, ©1987.

*Primary Examiner*—Mickey Yu
*Attorney, Agent, or Firm*—Hugh D. Jaeger

[57] ABSTRACT

A toy blimp with at least one engine, and preferably two, mounted on a top side of an inflatable helium balloon blimp like member, and an infrared control circuit and power supply mounted on a bottom side. The balloon can be aluminum coated mylar, or preferably of a material which retains helium. A remote control transmitter with push buttons transmits infrared control signals to the control circuitry on the balloon for horizontal and vertical directional control. The blimp operates from the self-contained power supply and is controlled by the self-contained control system which receives control signals from the transmitter. The blimp is intended for free flight and as an amusement.

1 Claim, 7 Drawing Sheets

TOY BLIMP

BACKGROUND OF THE INVENTION

1. Field of the Invention

The present invention pertains to a toy blimp, and more particularly, pertains to a toy blimp with an infrared control system for controlling the motor or motors on the blimp. The blimp is for free flight and limited in distance of flight by the distance of transmission and reception of the infrared control signals.

2. Description of the Prior Art

Prior art toy blimps have utilized motors on the underside of the blimp, which have provided a decreasing lift instead of an increasing lift during operation. Prior art blimps have been controlled in flight with wires supplying power and/or control signals, limiting the path of flight. The prior art has also failed to recognize positioning the motors on the top of the blimp, while placing the control circuitry on the bottom of the blimp for weight distribution and lift. Further, with the advent of metalized polymers and helium retaining polymers and materials, particularly aluminized mylar on one or both sides, it has not heretofore been possible to have an inflatable member which maintained a volume of helium over a sustained time period. Finally, with the advent of economical light weight miniature motors and IC control circuitry, it has only recently been possible to power an inflatable member, while maintaining a minimal weight attached to the inflatable member.

The present invention overcomes the disadvantages of the prior art by providing an inflatable balloon or blimp like member which maintains inflation over a sustained period of time, and utilizes light-weight electrical control circuitry for providing the necessary directional control and a power supply for free flight of the inflatable member.

SUMMARY OF THE INVENTION

The general purpose of the present invention is a flying toy blimp which is operational, as well as functional, at a reasonable cost to the customer. The blimp includes top mounted engines, a bottom mounted power supply and control circuit for balance and stability, and is controlled by an infrared hand-held transmitter or radio. The blimp is easily utilized by an individual and is intended for operation by children and adults. The toy blimp is battery powered by batteries on the underside of the blimp. The blimp structure itself is constructed of helium retaining metalized polymer plastic which maintains a charge of helium over a sustained period, time of several months. Buoyancy trim can be maintained by water in an eye dropper attached to a bottom side of the blimp.

According to one embodiment of the present invention, there is provided a blimp of a helium filled balloon with two motor propeller assemblies on a top side of the balloon, and a control unit on a bottom side of the balloon. The two motor propeller assemblies on the top side provide upward lift and the power supply/control unit on the bottom side provides balance and stability to the toy blimp. The power supply/control unit includes a remote control receiver for receiving signals from a remote hand-held transmitter. The signals can be infrared or of any other suitable wavelength.

Significant aspects and features of the present invention include a toy blimp which is reasonable in cost to manufacture and use, and is inherently safe in that the motor propeller assemblies are mounted on the upper side of the blimp which provides that the blimp structure would hit an individual first before the motor propeller assembly could come in contact with an individual's body.

Other significant aspects and features of the present invention include a toy blimp which is used for purposes of education of aeronautical principals, provides amusement, and functions in an inherently safe manner during mode of operation.

Additional significant aspects and features of the present invention include twin motors which provide forward and reverse thrust, as well as 360° rotation about the center axis (not dependent on control surfaces). The blimp is primarily intended for indoor use where reaction time is limited. The two motors provide accurate control in three dimensions.

Another significant aspect and feature of the present invention is variable ballast in form of water in an eye dropper secured to the blimp to maintain desired buoyancy and to compensate for helium loss, atmospheric pressure variables, etc.

Further significant aspects and features include a blimp which is self-sufficient in carrying its control and power, and participates in "free flight" by not being wired to an external control.

Having thus described the embodiments of the present invention, it is the principal object hereof to provide a remote controlled toy blimp.

One object of the present invention is to provide a toy blimp which is functional, reasonable and economical in cost. The blimp is small in size because of the use of lightweight ICs and lightweight miniature motors. The components are of minimal weight which requires a smaller balloon and a least amount of helium to obtain the prerequisite lift.

Another object of the present invention is to provide a toy blimp which is safe in operation when used by children to adults in age.

A further object of the present invention is to provide a toy blimp which provides for recreational use, as well as educational use, of control principles and aerodynamic principles.

BRIEF DESCRIPTION OF THE DRAWINGS

Other objects of the present invention and many of the attendant advantages of the present invention will be readily appreciated as the same becomes better understood by reference to the following detailed description when considered in connection with the accompanying drawings, in which like reference numerals designate like parts throughout the figures thereof and wherein.

DESCRIPTION OF THE PREFERRED EMBODIMENTS

Figure 1:
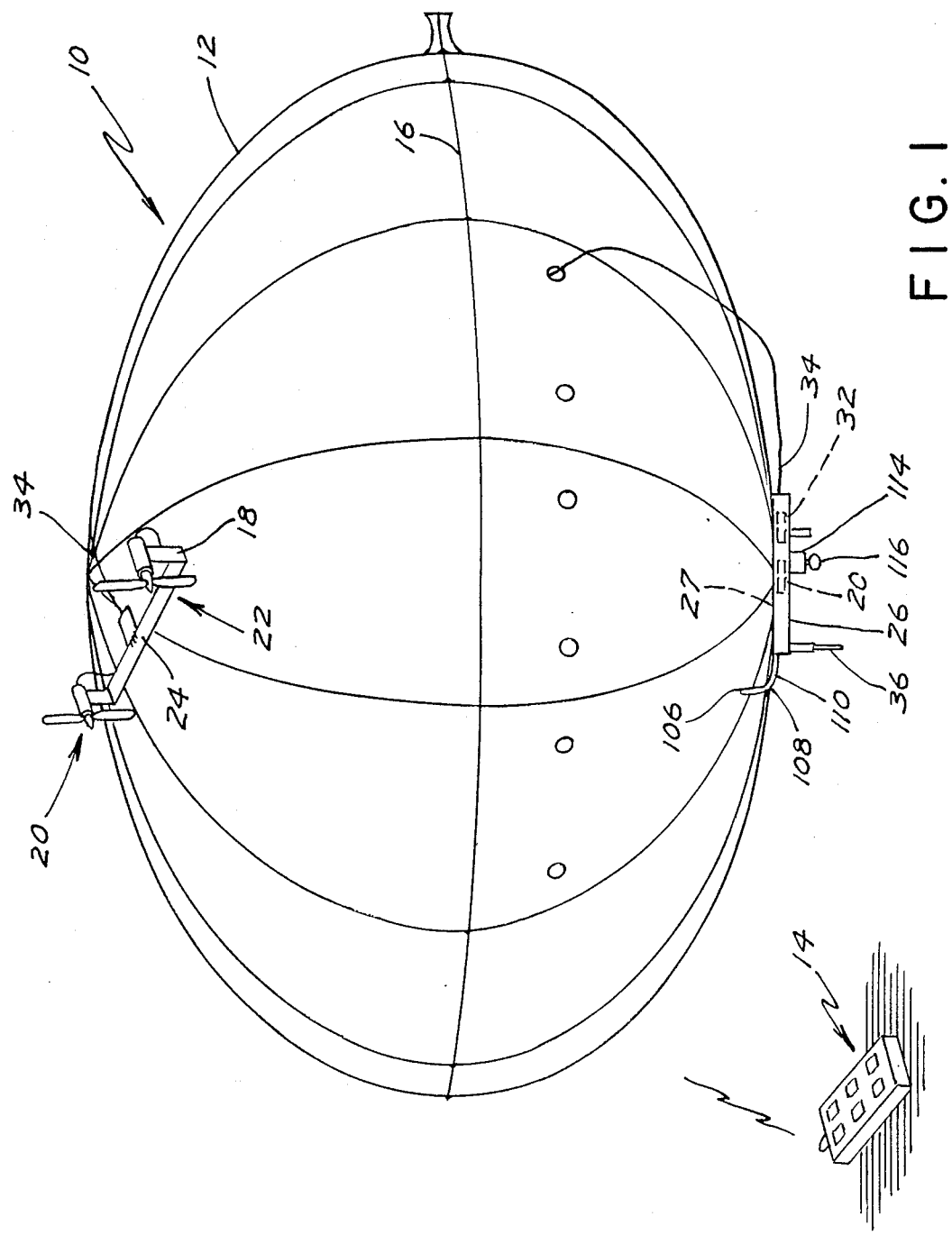
FIG. 1 illustrates a perspective view of a toy blimp and a remote control.

FIG. 1 illustrates a perspective view of a toy blimp 10. The toy blimp 10 includes an inflatable ellipsoid or balloon like member 12 and a remote control 14. The inflatable ellipsoid member 12 can be a metalized polymer material, preferably aluminized on one or both sides, to enhance the sustaining of a lighter than air atmosphere, such as helium, within the blimp or balloon like member. Any other suitable helium retaining material fashioned into a floatable member is considered within the teachings and disclosure of the present invention. A seam 16 can be provided joining the two halves of the inflatable member 12 together with a seamed tail. The inflatable member 12 can assume any geometrical configuration, whether it be a blimp, a rocket ship, airplane, flying wing, or any other desired geometrical configuration, and preferably, although not required, having aerodynamic qualities. The principals of operation are considered within the teachings of the disclosure of the present invention. A U-shaped bracket 18, with motor propeller assemblies 20 and 22, can be aluminum, plastic, foam board or any other like lightweight structural material. Velcro attachment strip or double sided tape 24 secures the bottom of the U-shaped bracket 18 to the top side of the toy blimp 10 so that the bracket 18 can be repositioned at any time for weight distribution at the top or elsewhere on the balloon member.

A power supply and control circuit housing 26, including one or more batteries 28 and the receiver and control circuit 30, positions on the bottom side of the balloon 12 with Velcro attachment strip or double sided tape 27 so that the housing 26 and members contained therein can be repositioned at any time on the balloon for weight distribution. Infrared photo diodes 32 positioned about the underside of the housing 26. The housing 26 substantially and diametrically opposes, and is geometrically positioned about the motor propeller assemblies 20 and 22 for weight balance and aerodynamic stability. A lightweight cable assembly 34 connects between the control circuit 30 and each of the motor propeller assemblies 20 and 22 about the balloon. An eyedropper 36 can mount on the power supply control circuit housing 26, and serves as a ballast trimmer. Water quantity in the eyedropper 36 is adjusted by actuating the eyedropper to attain the proper amount of water ballast to achieve the desired buoyancy of the balloon 12. Because the blimp may loose about a gram of lift per month, the neutral buoyancy is maintained and controlled by ejecting an appropriate amount of water from the eyedropper. When the balloon is filed with helium, the eyedropper is filled with water. As the helium is lost through normal leakage, the water volume can be likewise adjusted. An optional heater wire 106 can be secured within the interior of the balloon 12 through a patch 108 with adhesive 110 and can be powered by the batteries 28 through the circuitry as later described to increase positive buoyancy of the blimp 12. One or more optional lights 112a–112n can be powered by the batteries 28 through the circuitry as later described. An optional latch relay 114 connected to the circuitry can be actuated to drop a payload 116, such as a ping pong ball.

Figure 2:
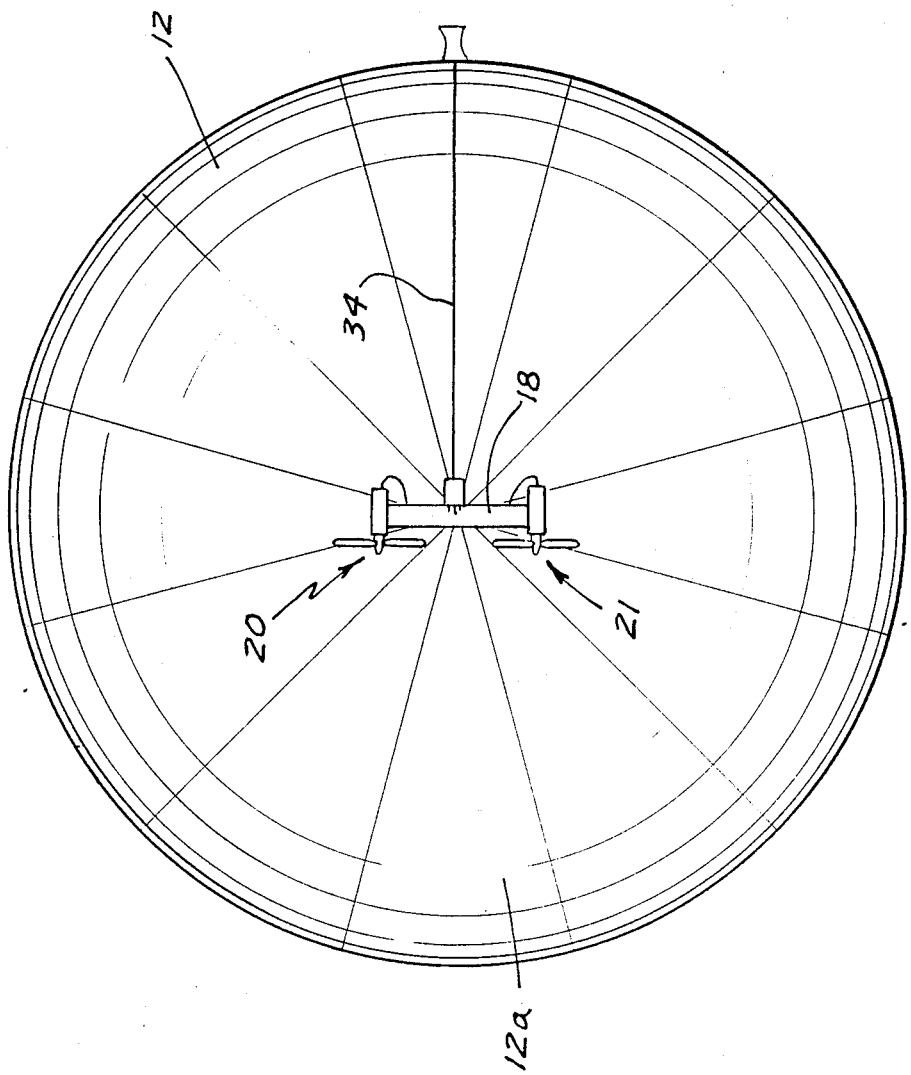
FIG. 2 illustrates a top view taken along aspect line 2—2 of FIG. 1.

FIG. 2 illustrates a top view taken along line 2—2 of FIG. where all numerals correspond to those elements previously described. It is noted that the motor propeller systems 20 and 22 and the U shaped bracket 18 are mounted forward of the center point of the inflatable balloon 12 to cant the propeller rotation axis 10°-20° downwardly towards the front 12a of the inflatable member 12.

Figure 3:
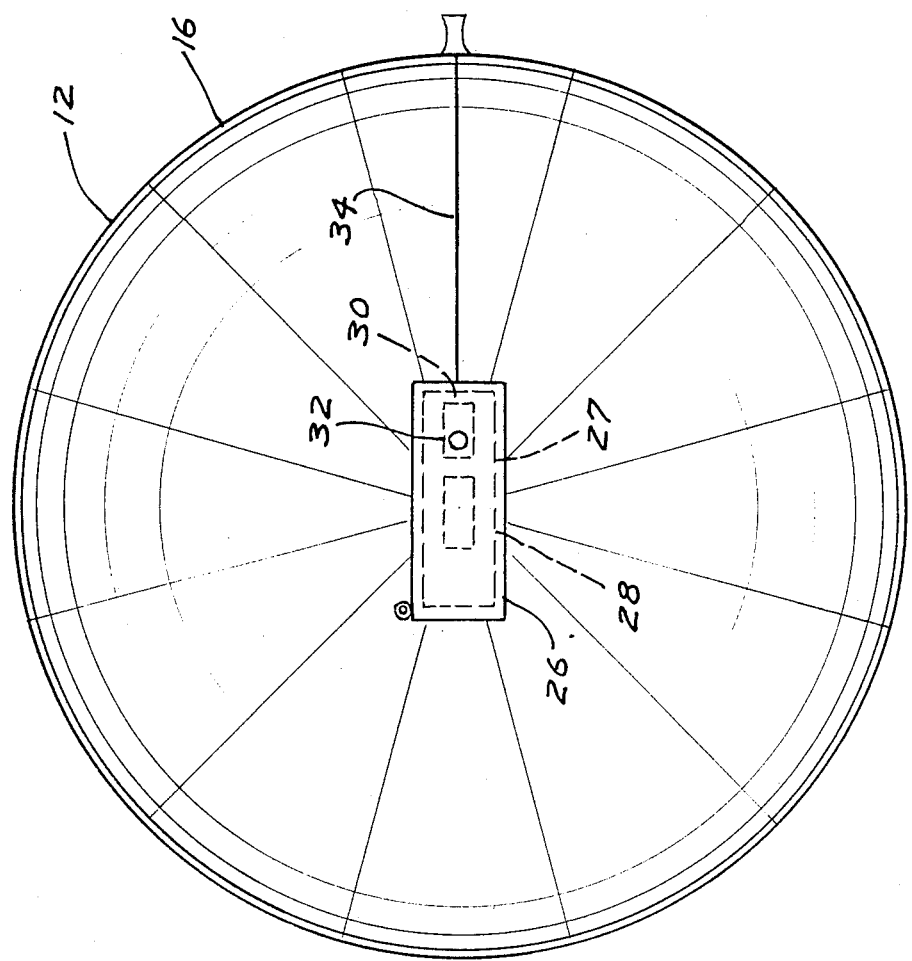
FIG. 3 illustrates a bottom view taken along aspect line 3—3 of FIG. 1.

FIG. 3 illustrates a bottom view taken along line 3—3 of FIG. 1 where all numerals correspond to those elements previously described. The control circuit housing 26, including the battery or batteries 28, are positioned within the Velcro attachment strip 27 so as to provide proper balancing of the control circuit housing 26 with respect to the motor propeller assemblies 20 and 22. The weight of the control circuit housing on the bottom side of the balloon member 12 provides for weighted stability of the blimp 10 to maintain the top side up and the weighted bottom side down.

Figure 4:
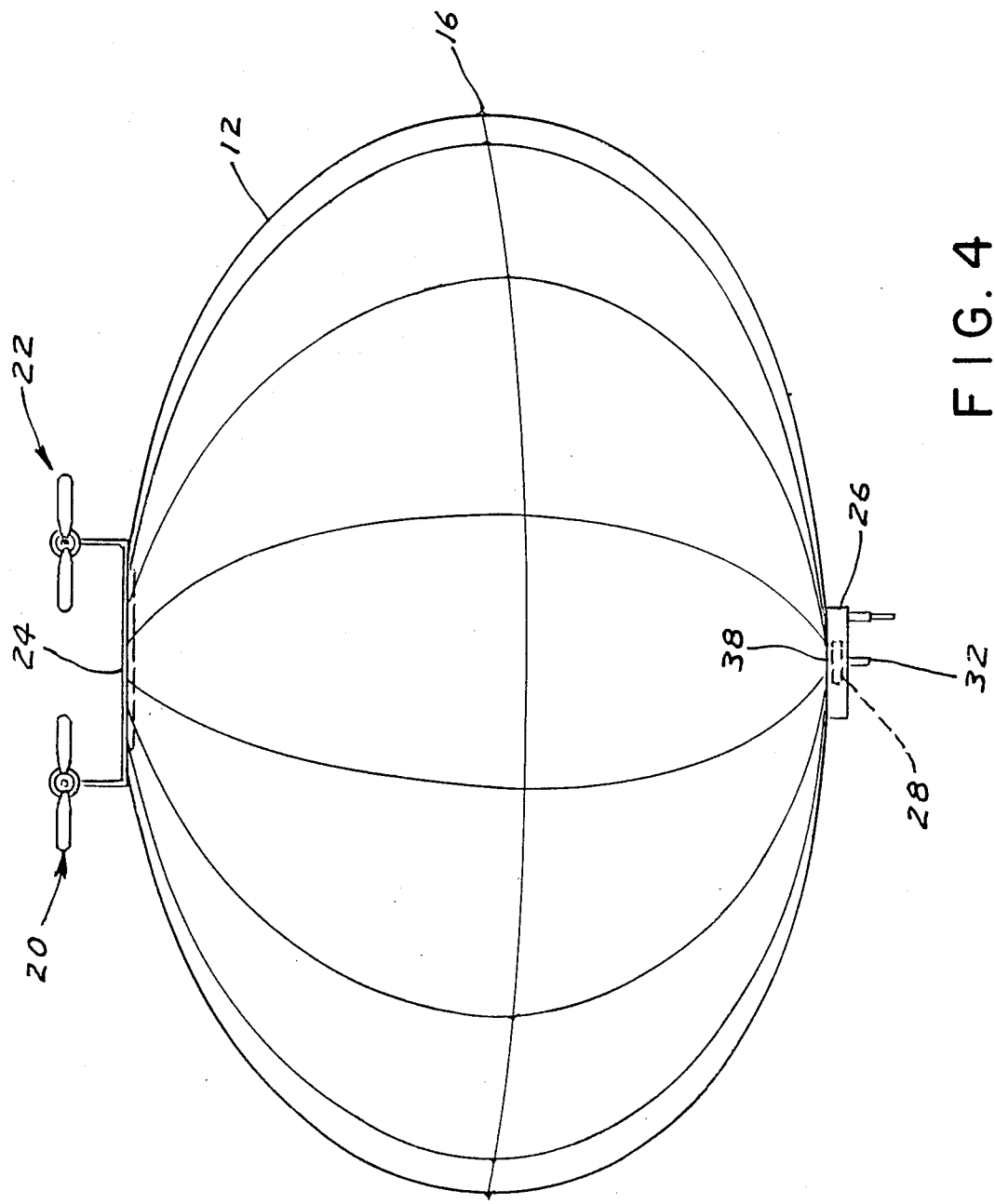
FIG. 4 illustrates a side view taken along aspect line 4—4 of FIG. 1.

FIG. 4 illustrates a front view taken along line 4—4 of FIG. 1 where all numerals correspond to those elements previously described.

Figure 5:
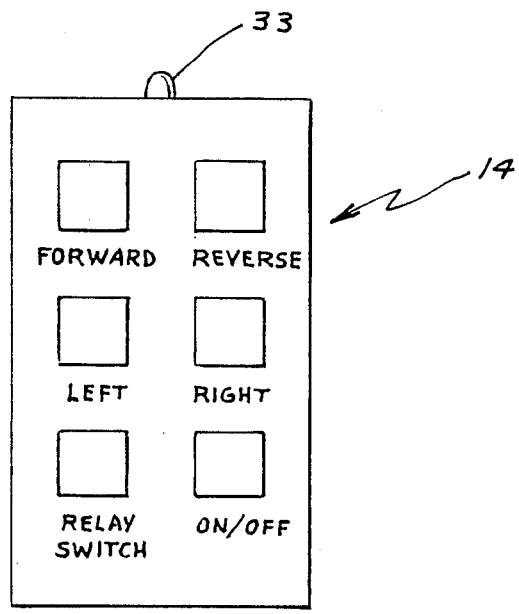
FIG. 5 illustrates a top view of the remote control.

FIG. 5 illustrates a top view of the remote control 14 showing the placement of the control switches as labeled in the drawing and the infrared diode 33.

Figure 6:
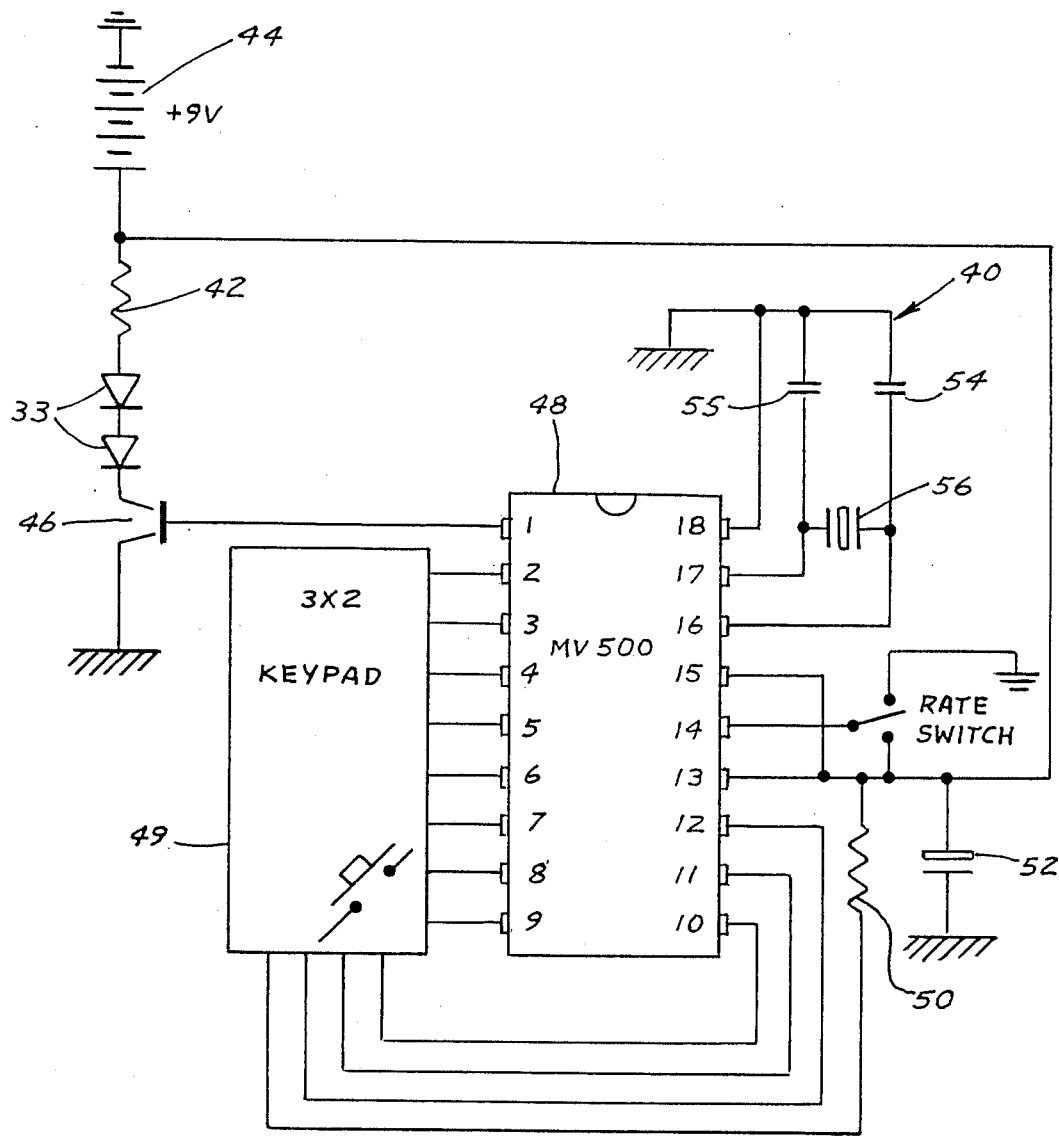
FIG. 6 illustrates a remote control electrical circuit schematic diagram.

FIG. 6 illustrates a hand-held remote control electrical circuit schematic 40 for the hand-held remote control 14 with infrared diode 33. A biasing resistor 42 connects between the diode 33 and the battery 44. A switching transistor 46 connects to a remote control transmitter IC 48, such as a Plessey MV500. A key pad 49, such as in a 3×2 configuration, connects to the IC 48. Biasing resistor 50 and decoupling capacitor 52 connect to the IC 48. Capacitors 54 and 55 and a ceramic resonator 56 form a resonating circuit. Switch 58 determines the rate.

Figure 7:
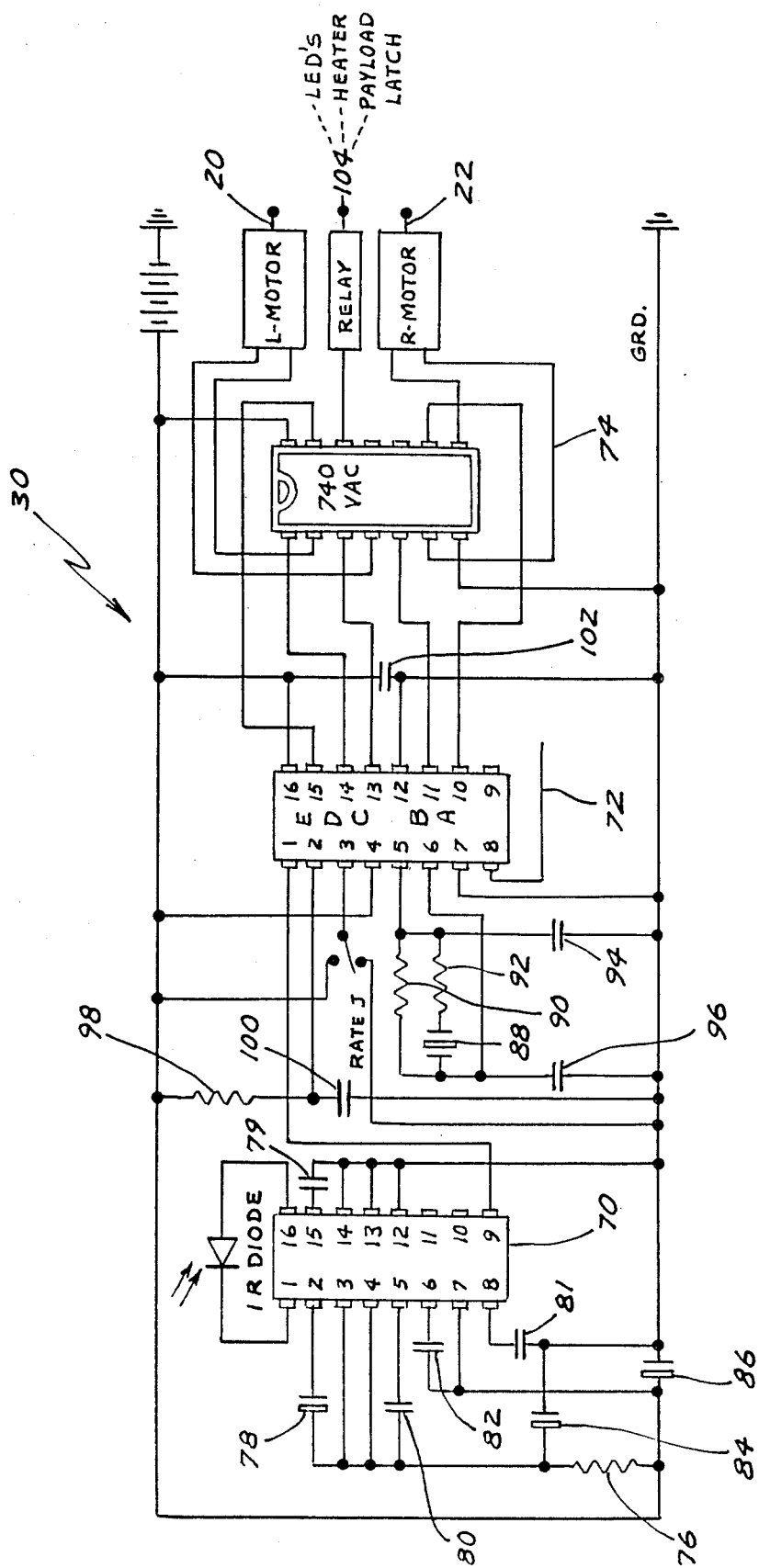
FIG. 7 illustrates a receiver control circuit.

FIG. 7 illustrates an electrical circuit schematic diagram for the receiver control circuit 30 which mounts in the power supply and control circuit housing 26 on the under side of the inflatable member 12 including an infrared remote control preamp IC 70 such as a Plessey SL486, a remote control IC receiver 72 such as a Plessey MV600, and an inverter driver IC 74 such as a 74D4AC. Biasing resistor 76 and decoupling capacitors 78, 79, 80, 81, 82, 84 and 86 connect to IC 70. A ceramic resonator 88, resistors 90 and 92, and capacitors 94 and 96 form a resonating circuit. Resistor 98 and capacitor 100 are connected accordingly. Capacitor 102 is for decoupling. Driver IC 74 connects to motors 20 and 22 and to an optional relay 104 for controlling either the electrical heater element, the relay latch device for dropping a lightweight payload object from the blimp, such as a ping-pong ball, or a light or plurality of lights such as LEDs.

MODE OF OPERATION

The two electric motors provide full three axis control of the balloon including forward and reverse thrust, climbs or descents and left and right 360° directional control. Upward movement is provided by the direction of motors where the position of the motors point slightly down at 10°-20° relative to the longitudinal axis of balloon, as well as the "Bernoulli" lift generated by the air passing more quickly over the top because of the thrust generated by the propellers than over the bottom, generating upward lift. Buoyancy is controlled by a small "eyedropper" with water to compensate for helium loss.

The transmitted signal is of a digital signal nature. The transmitter sends coded pulse bits that are decoded by the receiver and presented to the motors as forward, reverse or off signals wherein the signals are latched, but could be momentary signals in the alternative.

Various modifications can be made to the present invention without departing from the apparent scope hereof. In this example, the expandable member is 24 inches in diameter, 12 inches in height and contains about 3 cubic feet of helium, although any size can be utilized as so desired. The disclosures and teachings of the present invention for a blimp are to include any geometrically shaped inflated member, such as a helicopter, an airplane, biplane, space ship, rocket ship, Star Trek type platform, flying wing, stealth configurations, and any other type of a flying geometrical configuration. The principals of the use of one motor or a plurality of motors extend to all of these geometrical configurations, which only requires the mounting of the motor propeller assemblies and the control circuit. The motors can be mounted anywhere on the balloon such as on the opposing sides. Likewise, the control and power supply housing can be appropriately mounted. While the toy blimp or flying toy system is intended to be put together with least effort, the unit can also be manufactured, inflated and delivered to an individual's home. While the transmitted signals are digital, analog signals could likewise be utilized. Radio frequency (RF) signals could be utilized in lieu of the infrared signals. The balloon can have a cutaway tail to compensate for helium loss by cutting away sections of a molded seam of the tail. In the alternative, a valve can be inserted in the tail for adding helium. The motor propeller assembly and the power supply and control circuit can be mounted elsewhere on the balloon as so desired, and are not limited to the top-bottom configuration as suggested.

I claim:
1. Toy blimp for indoor and outdoor use comprising:
a. means for inflatably holding a gas which is lighter than air;
b. housing fixedly attachable to the outer underside periphery of said inflatably holding means using hook and latch means;
c. battery removably attached within said housing;
d. two spaced electric motors electrically coupled to said battery and mechanically coupled to the periphery of said inflatably holding means using hook and latch means on the outer upperside periphery of said inflatably holding means;
e. propellers mechanically coupled to said electric motors and rotation of said electric motors cause rotation of said propellers and movement of air relative to said inflatably holding means;
f. remote control transmitter for sending control signals;
g. means located within said housing for receiving said control signals;
h. means responsively coupled to said receiving means and said motors for controlling the rotation of said motors in response to said control signals received by said receiving means; and,
i. means coupled to said housing for releasably holding a supply of ballast to said toy blimp whereby said toy blimp is flyable indoors and outdoors as a free-flying, safe, self-contained toy.

* * * * *

UNITED STATES PATENT AND TRADEMARK OFFICE
CERTIFICATE OF CORRECTION

PATENT NO. : 4,931,028

DATED : Jun. 5, 1990

INVENTOR(S) : James M. Hawley

It is certified that error appears in the above-identified patent and that said Letters Patent is hereby corrected as shown below:

On the title page, under item [19], "Jaeger et al." should read --Hawley--;

item [76], "Hugh D. Jaeger, 3209 W. 76th St., #207, Minneapolis, Minn. 55435;" should be deleted.

Signed and Sealed this

Twenty-second Day of January, 1991

Attest:

HARRY F. MANBECK, JR.

Attesting Officer

Commissioner of Patents and Trademarks